United States Patent [19]

Bernhard

[11] Patent Number: 5,041,237

[45] Date of Patent: Aug. 20, 1991

[54] AQUEOUS SOLUTION CONTAINING SULPHUR DIOXIDE AND SODIUM IN HIGH PERCENTAGES, ITS MANUFACTURE AND USE

[75] Inventor: Ragnar Bernhard, Falun, Sweden

[73] Assignee: Stora Kopparbergs Berglags AB, Falun, Sweden

[21] Appl. No.: 343,276

[22] Filed: Apr. 26, 1989

[30] Foreign Application Priority Data

Sep. 8, 1983 [SE] Sweden .................... 8304824
Sep. 6, 1984 [FI] Finland .................... 843489
Sep. 7, 1984 [NO] Norway .................... 843565

[51] Int. Cl.$^5$ ............................. C01B 17/62
[52] U.S. Cl. ................. 252/188.21; 252/188.2; 162/83
[58] Field of Search ................. 252/188.21

[56] References Cited

U.S. PATENT DOCUMENTS

| | | | |
|---|---|---|---|
| 2,400,377 | 5/1946 | Speakman | 252/188.21 |
| 3,098,710 | 7/1963 | Ahlburg et al. | 252/188.21 |
| 3,402,992 | 9/1968 | Ahlborg | 252/188.21 |
| 3,477,815 | 11/1969 | Miller et al. | 252/188.21 |
| 3,485,581 | 12/1969 | Miller et al. | 252/188.21 |
| 3,719,705 | 3/1973 | Mita et al. | 252/188.21 |
| 3,822,180 | 7/1974 | Mita et al. | 252/188.21 |
| 3,826,710 | 7/1974 | Anderson | 252/188.21 |
| 4,140,651 | 2/1979 | Burnell et al. | 252/188.21 |
| 4,148,684 | 4/1979 | Farin | 252/188.21 |

OTHER PUBLICATIONS

*Chemical Abstract*, 95(14): 117684, "Production of Sodium Hydrogen Sulfite . . .".
Masson, M. R. (Ed.), *Solubility Data Series, vol. 26. Sulfites, Selenites and Tellurites*, (1986) Pergamon Press, Oxford, England, pp. 39–45 and 72–77.

*Primary Examiner*—Richard D. Lovering
*Assistant Examiner*—Joseph D. Anthony
*Attorney, Agent, or Firm*—Fred Philpitt

[57] ABSTRACT

An aqueous solution containing sulphur dioxide and sodium in high percentages is obtained by bringing sulphur dioxide into contact with a recirculating aqueous solution of sodium hydroxide and previously absorbed sulphur dioxide to obtain a ratio between $SO_2$ and the sum of $SO_2$ and $Na_2O$ of 0.61–0.66, preferably 0.63–0.65, and a concentration of $SO_2$ and $Na_2O$ amounting to 85–98%, preferably about 95% of the solubility maximum of the solution at the ratio and storage temperature in question.

The invention also relates to a solution having the aforesaid ratio of $SO_2/(SO_2+Na_2O)$ and concentation and its use for sulphite cooking purposes or for bleaching purposes.

4 Claims, 1 Drawing Sheet

AQUEOUS SOLUTION CONTAINING SULPHUR DIOXIDE AND SODIUM IN HIGH PERCENTAGES, ITS MANUFACTURE AND USE

This is a continuation of application Ser. No. 731,297, filed May 7, 1985 now abandoned and the benefits of 35 USC 120 are claimed relative to it.

The present invention relates to an aqueous solution containing sulphur dioxide ($SO_2$) and sodium in high percentages; a method for the preparation of said solution; and the use of the solution for sulphite cooking or for bleaching purposes.

Sulphur dioxide is retailed in free form, as liquid sulphur dioxide, as well as in chemically bound form as solid sodium sulphite, $Na_2SO_3$, or as solid sodium bisulphite, $Na_2S_2O_5$ (actually sodium pyrosulphite). A common feature of all three products is that they are difficult to handle. Thus, the handling of liquid sulphur dioxide presumes the use of pressure vessels, while the solid products are handled in sacks, which latter handling creates considerable dust problems.

Sulphite-bisulphite solutions having a pH-value in the range of from 6.2 to 6.5 have been prepared by scrubbing flue gases containing sulphur dioxide and adding sodium hydroxide.

This pH-range has been conditioned by the facts that the process can be readily controlled within said range and that a lower pH-value should be expected to result in increased sulphur dioxide emissions, due to reduced absorption efficiency. The low solubility of sodium sulphite at these pH-values, however, results in a low concentration of sulphur dioxide in the resultant solutions, thereby rendering the cost of transporting the solutions so high that the solutions have only obtained limited, internal use.

It is also difficult to increase the solubility by raising the temperature, since the solubility of sodium sulphite again decreases at temperatures above 32.5° C.

Bisulphite is much more soluble than sulphite and does not exhibit the same unfavourable temperature dependency.

It has now surprisingly been found that sulphite-bisulphite solutions which combine the ability of the sulphite to absorb sulphur dioxide with the solubility of the bisulphite can be obtained by reducing the pH-value during the scrubbing process. The solubility maximum lies at a pH-value of about 5.5. The solubility is only slightly reduced when the pH-value is further lowered. The expected reduction in absorption efficiency is counter-acted in part by the fact that the increase in concentration enables recirculation of chemicals to be increased at unchanged quantities of recirculated solution. A lower pH-value and a higher concentration also reduces the oxidation rate and enables the formation of undesirable sodium sulphate to be minimized.

This lowering of the pH-value is achieved by increasing the ratio between sulphur dioxide and the sum of sulphur dioxide and sodium oxide ($Na_2O$). (In calculations of this type sodium is normally calculated as $Na_2O$. In addition, these calculations only take into account active chemicals, i.e. chemicals which are active in a sulphite cook.)

It has been found in accordance with the invention that the solubility maximum at 10° C. occurs at a ratio of about 0.65 and is displaced toward lower ratios at increasing temperature, down to a ratio of about 0.6i at a temperature of about 32.5° C., and is displaced back toward higher ratios at temperatures thereabove. This is illustrated by the following Table, which discloses the solubility at varying temperatures and at a plurality of ratios $SO_2/(SO_2+Na_2O)$.

TABLE

| $SO_2/$ $(SO_2 + Na_2O)$ | Solubility $Na_2O-SO_2$ (percent by weight) at | | | | | |
|---|---|---|---|---|---|---|
| | 10 | 15 | 20 | 25 | 30 | 65° C. |
| 0,674 | 38,5 | 38,9 | 39,3 | 39,8 | 40,3 | 43,8 |
| 0,661 | 40,3 | 40,6 | 40,8 | 41,0 | 41,2 | 44,9 |
| 0,643 | 38,3 | 41,0 | 41,2 | 41,4 | 41,5 | 46,5 |
| 0,630 | 33,0 | 36,3 | 39,5 | 41,3 | 41,5 | 42,9 |
| 0,617 | 30,1 | 33,3 | 36,0 | 39,2 | 41,2 | 39,5 |
| 0,567 | 20,4 | 23,6 | 26,4 | 29,5 | 31,9 | 29,8 |

The full line drawn through the table shows approximately the position of the critical ratio $SO_2/(SO_2+Na_2O)$ at which a slight reduction results in a strong decrease in solubility, due to the fact that the solubility is here controlled by sulphite and not by bisulphite.

It will be seen from the table that by changing the ratio $SO_2/(SO_2+Na_2O)$ from 0.567 (corresponding to a pH-value of about 6.4) to 0.64 (corresponding to a pH-value of about 5.5) it is possible to increase the concentration $Na_2O+SO_2$ by about 90% at 10° C. and about 40% at 30° C.

On the basis hereof the invention relates to an aqueous solution containing sulphur dioxide and sodium in high percentages, in which solution the ratio between $SO_2$ and the sum of $SO_2$ and $Na_2O$ ($SO_2/(SO_2+Na_2O)$) is 0.61-0.66, preferably 0.63-0.65 and the concentration of $SO_2$ and $Na_2O$ is 85-98%, preferably about 95% of the solubility maximum of the solution at the ratio and storage temperature in question.

It will be seen from the above table that ratios above 0.66 certainly afford a solubility which exceeds the solubility of previously known solutions having pH-values in the range of 6.2-6.5. However, the sulphur dioxide emission at these high ratios is unacceptably large.

It has also been found suitable in accordance with the invention not to utilize the solubility in the solutions to a maximum, but to work at a safety margin with view to fluctuations in storage temperature, etc.

The invention also relates to a method of preparing an aqueous solution containing sulphur dioxide and sodium in high percentages, which method comprises bringing sulphur dioxide into contact with a recirculating aqueous solution of sodium hydroxide and previously absorbed sulphur dioxide to a ratio between $SO_2$ and the sum of $SO_2$ and $Na_2O$ of 0.61-0.66, preferably 0.63-0.65, and a concentration amounting to 85-98%, preferably about 95%, of the solubility maximum of the solution at the ratio and storage temperature in question.

According to a preferred embodiment of the method according to the invention sulphur dioxide is added in the form of a preferably dry sulphur dioxide containing flue gas, such as a flue gas obtained in the manufacture of sulphuric acid. Flue gases obtained from plants which combust sulphur-containing fuels can also be used, provided that measures are taken to prevent the condensation of water when treating the gas with the recirculating aqueous solution of sodium hydroxide and sulphur dioxide.

The gas is preferably brought into contact with the aforesaid recirculating aqueous solution in a conventional scrubber system.

The method according to the invention is preferably carried out continuously, a part of the solution being withdrawn from recirculation and replaced with an aqueous solution of sodium hydroxide.

In principle, the sulphur dioxide can also be supplied in the form of liquid sulphur dioxide, although liquid sulphur dioxide is a much more expensive starting material than sulphur dioxide obtained from flue gases.

The invention also relates to the use of an aqueous solution according to the invention for sulphite cooking processes, particularly for cooking wood chips to obtain high yield pulps, or for bleaching purposes. In this regard the solution can be used either without being diluted or after being diluted with water. When so desired or required, a solution of sodium hydroxide can be added to the system to adjust the pH-value thereof.

The invention will now be illustrated further with the aid of a number of examples.

EXAMPLE

Flue gas obtained from a sulphuric acid plant and containing 0.32 percent by volume sulphur dioxide was scrubbed in a conventional flue gas scrubber with recirculating sulphite-bisulphite solution, to which 50% by weight aqueous sodium hydroxide solution and water were added to maintain constant conditions. The recirculating solution was heated in a heat exchanger, so as also to obtain constant temperature.

EXPERIMENT A

In this experiment the temperature was 13° C. A sulphur dioxide absorption of 91% was obtained with a ratio of $SO_2/(SO_2+Na_2O)$ of 0,643, and the concentration of $SO_2+Na_2O = 39.0\%$.

EXPERIMENT B

In this experiment the temperature was 20° C., the ratio equal to 0.640, the concentration 39.2% and the absorption degree 90%.

EXPERIMENT C

In this experiment the temperature was 30° C., the ratio equal to 0.635, the concentration 40.0% and the absorption degree 91%.

I claim:

1. A method of preparing an aqueous salt solution consisting of sodium, sulfite and bisulfite ions in water, in which solution sulfur dioxide and sodium are present in high percentages, which method consisting essentially of bringing sulfur dioxide into contact with a circulating aqueous solution of sodium hydroxide and previously absorbed sulfur dioxide to a ratio between $SO_2$ and the sum of $SO_2$ and $Na_2O$ of 0.61–0.66 and a concentration of $SO_2$ and $Na_2O$ amounting to 85–98% of the solubility maximum of the solution at said ratio and the temperature at which said solution is to be stored, said ratio being maintained by adding an aqueous sodium hydroxide solution to said recirculating aqueous solution.

2. A method according to claim 1, wherein sulfur dioxide is added to a ratio between $SO_2$ and the sum of $SO_2$ and $Na_2O$ of 0.63–0.65.

3. A method according to claim 1, wherein sulfur dioxide is added to a concentration of $SO_2$ and the sum of $SO_2$ and $Na_2O$ of about 95% of the solubility maximum of the solution at said ratio and the temperature at which said solution is to be stored.

4. A method according to claim 1, wherein sulfur dioxide is supplied in the form of a dry, sulfur dioxide-containing flue gas obtained in the manufacture of sulfuric acid.

* * * * *